United States Patent
Remis et al.

(10) Patent No.: US 10,990,299 B2
(45) Date of Patent: Apr. 27, 2021

(54) STORING DATA BASED ON THE PHYSICAL ACCESSIBILITY OF DATA STORAGE DEVICES

(71) Applicant: LENOVO Enterprise Solutions (Singapore) PTE. LTD., New Tech Park (SG)

(72) Inventors: Luke Remis, Raleigh, NC (US); Wilson Velez, Raleigh, NC (US); Christopher L. Wood, Chapel Hill, NC (US); Mark E. Andresen, Cary, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 337 days.

(21) Appl. No.: 15/936,222

(22) Filed: Mar. 26, 2018

(65) Prior Publication Data
US 2019/0294332 A1 Sep. 26, 2019

(51) Int. Cl.
*G06F 3/06* (2006.01)
(52) U.S. Cl.
CPC ............. *G06F 3/062* (2013.01); *G06F 3/064* (2013.01); *G06F 3/0683* (2013.01)
(58) Field of Classification Search
CPC . G06F 3/062; G06F 3/0622; G06F 2221/2111
See application file for complete search history.

(56) References Cited

U.S. PATENT DOCUMENTS

| | | | | |
|---|---|---|---|---|
| 7,797,751 B1* | 9/2010 | Hughes | ................... | G06F 21/64 726/26 |
| 8,060,596 B1* | 11/2011 | Wootton | ............. | G06F 21/6218 709/223 |
| 2003/0046020 A1* | 3/2003 | Scheuerlein | ........... | G01K 3/005 702/132 |
| 2016/0232383 A1* | 8/2016 | Chakhaiyar | ............. | G06F 21/85 |

(Continued)

OTHER PUBLICATIONS

AlertBoot, AlertBoot Endpoint Security, www.alertboot.com/blog/blogs/endpoint_security/archive/2009/03/21/hard-disk-encryption-not-used-in-stolen-disk-at-jackson-memorial-hospital-data-center.aspx, Last visited Jan. 26, 2018.

*Primary Examiner* — Reginald G Bragdon
*Assistant Examiner* — Thanh D Vo
(74) *Attorney, Agent, or Firm* — Kunzler Bean & Adamson; Bruce R. Needham

(57) ABSTRACT

An apparatus for storing data based on physical accessibility of storage devices is disclosed. One embodiment of an apparatus includes a processor and a memory. The memory that stores code executable by the processor to acquire information related to physical accessibility for a plurality of data storage devices, each data storage device operably connected to a computing device. The code is further executable by the processor to classify the physical accessibility for each of the plurality of data storage devices based on the acquired information. Also, the code is executable by the processor to store data on a data storage device of the plurality of data storage devices based on the classified physical accessibility for the data storage device and sensi- (Continued)

tivity of the data. Further, data with a higher sensitivity is stored on a data storage device classified with a lower accessibility than data with a lower sensitivity.

15 Claims, 5 Drawing Sheets

(56) References Cited

U.S. PATENT DOCUMENTS

| | | | |
|---|---|---|---|
| 2016/0378400 A1* | 12/2016 | Yang | G11C 16/3495 |
| | | | 711/156 |
| 2018/0026910 A1* | 1/2018 | Balle | B25J 15/0014 |
| | | | 709/226 |
| 2018/0067678 A1* | 3/2018 | Jeong | G06F 3/064 |

* cited by examiner

STORING DATA BASED ON THE PHYSICAL ACCESSIBILITY OF DATA STORAGE DEVICES

FIELD

The subject matter disclosed herein relates to securely storing data and more particularly relates to storing data based on the physical accessibility of storage devices

BACKGROUND

In computing systems, data is stored on data storage devices. In certain systems, some data storage devices may be hot-swappable, front accessible, or otherwise easily accessible. Due to the ease of accessing certain data storage devices, there is a risk that the data storage devices may be stolen in an effort to acquire personal and private information.

BRIEF SUMMARY

An apparatus for storing data based on physical accessibility of storage devices is disclosed. One embodiment of an apparatus includes a processor and a memory. The memory that stores code executable by the processor to acquire information related to physical accessibility for a plurality of data storage devices, each data storage device operably connected to a computing device. The code is further executable by the processor to classify the physical accessibility for each of the plurality of data storage devices based on the acquired information. Also, the code is executable by the processor to store data on a data storage device of the plurality of data storage devices based on the classified physical accessibility for the data storage device and sensitivity of the data. Further, data with a higher sensitivity is stored on a data storage device classified with a lower accessibility than data with a lower sensitivity.

One embodiment of a method for storing data based on physical accessibility of the data storage devices includes acquiring information related to physical accessibility for a plurality of data storage devices, each data storage device operably connected to a computing device. The method includes classifying the physical accessibility for each of the plurality of data storage devices based on the acquired information. The method includes storing data on a data storage device of the plurality of data storage devices based on the classified physical accessibility for the data storage device and sensitivity of the data. The data with a higher sensitivity is stored on a data storage device classified with a lower accessibility than data with a lower sensitivity.

One embodiment of a program product for storing data based on physical accessibility of the data storage devices includes a computer readable storage medium that stores code executable by a processor. The executable code includes code to acquire information related to physical accessibility for a plurality of data storage devices, each data storage device operably connected to a computing device. The executable code includes code to classify the physical accessibility for each of the plurality of data storage devices based on the acquired information. The executable code includes code to store data on a data storage device of the plurality of data storage devices based on the classified physical accessibility for the data storage device and sensitivity of the data. The data with a higher sensitivity is stored on a data storage device classified with a lower accessibility than data with a lower sensitivity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
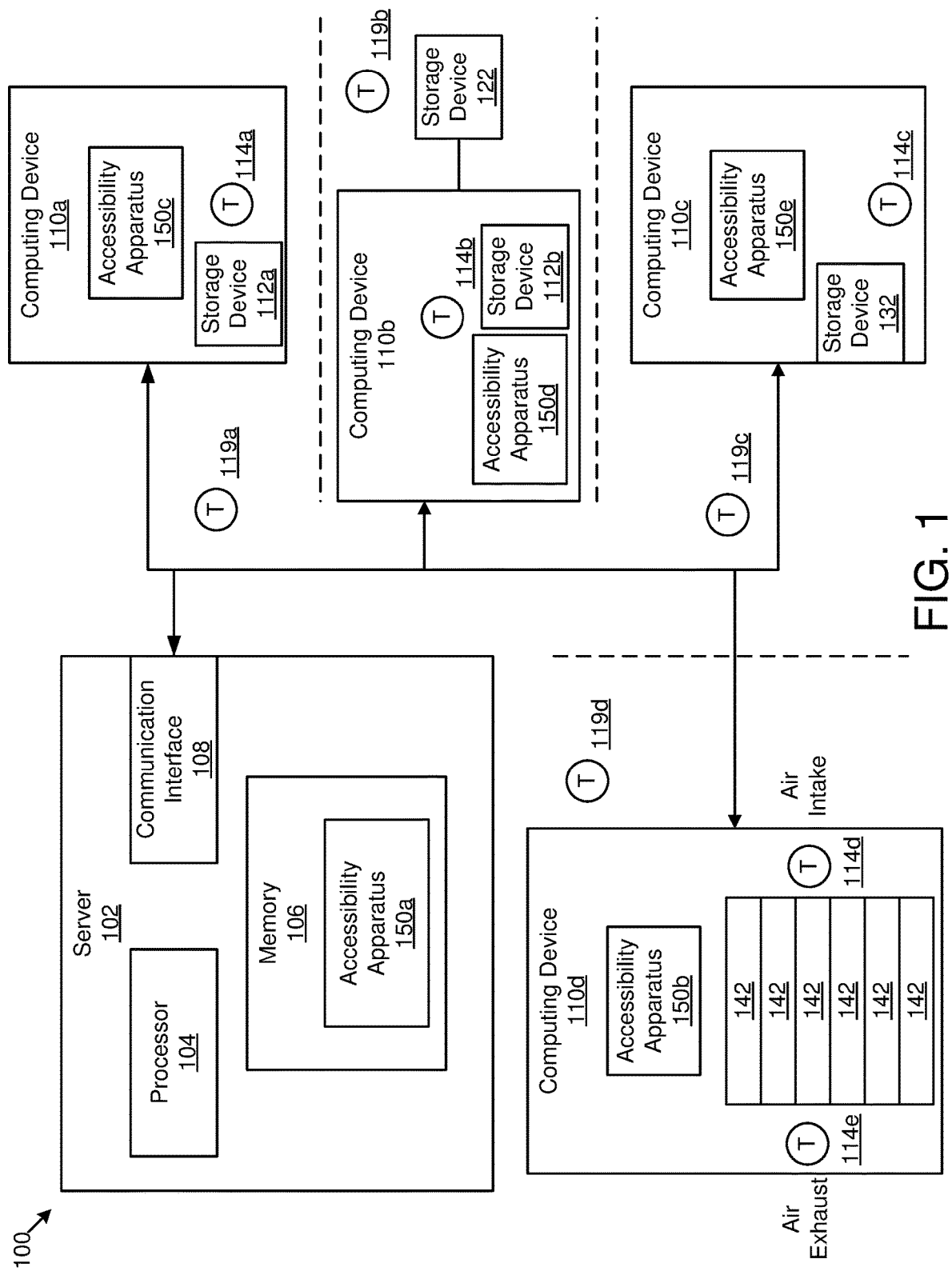
FIG. 1 is a schematic block diagram illustrating one embodiment of a system for storing data on data storage devices based on physical accessibility of the data storage devices.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more non-transitory computer readable storage devices storing machine readable code, computer readable code, and/or program code, referred hereafter as code. In a certain embodiment, the data storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The data storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the data storage device would include the following: an electrical connection having one or more wires, a portable computer diskette, a hard disk, a random-access memory (RAM), a read-only memory (ROM), an erasable programmable read-only memory (EPROM), a Flash memory, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). Modules may include hardware circuits, a programmable hardware device, a processor executing code and/or code stored on a non-transitory computer readable storage device, or any combination thereof.

Reference throughout this specification to "one embodiment," "an embodiment," or similar language means that a particular feature, structure, or characteristic described in connection with the embodiment is included in some embodiments. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the data storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for storing data based on physical accessibility of storage devices is disclosed. A method and computer program product also perform the functions of the apparatus. One embodiment of an apparatus includes a processor and a memory. The memory that stores code executable by the processor to acquire information related to physical accessibility for a plurality of data storage devices, each data storage device operably connected to a computing device. The code is further executable by the processor to classify the physical accessibility for each of the plurality of data storage devices based on the acquired information. Also, the code is executable by the processor to store data on a data storage device of the plurality of data storage devices based on the classified physical accessibility for the data storage device and sensitivity of the data. Further, data with a higher sensitivity is stored on a data storage device classified with a lower accessibility than data with a lower sensitivity.

In one embodiment, acquiring information related to physical accessibility includes accessing configuration information for one or more of the plurality of data storage devices. Further, the configuration information of a data storage device indicates physical accessibility of the data storage device. In a further embodiment, the configuration information includes stored information related to a system topology of at least a portion of the plurality of data storage devices and associated computing devices, the system topology information indicating physical accessibility of the at least a portion of the plurality of data storage devices. In an additional embodiment, the configuration information of a data storage device of the plurality of data storage devices includes a model number, a form factor, a data storage device type, hardware vital product data ("VPD"), and/or component capability information. In another embodiment, accessing the configuration information includes accessing the configuration from the plurality of data storage devices.

In one embodiment, acquiring the information related to physical accessibility includes determining a data storage device temperature for one or more data storage devices in the plurality of data storage devices and one or more ambient temperatures for one or more environments containing the one or more data storage devices. In a further embodiment, determining a data storage device temperature includes determining a difference between the data storage device temperature for the data storage device and an ambient temperature for the data storage device being greater than a temperature difference threshold. In an additional embodiment, the ambient temperature includes one of an ambient temperature of a room where the data storage device is located and an ambient temperature internal to a computing device where the data storage device may be mounted.

In one embodiment, classifying the physical accessibility for each of the plurality of data storage devices includes determining a level of physical security for each of the plurality of data storage devices. In additional embodiments, levels of physical security for the data storage devices include internally mounted, externally mounted, secured in place, and/or hot-swappable. Further, each of an internally mounted data storage device, a secured in place data storage device, a hot-swappable data storage device, and an externally mounted data storage device each have a different physical accessibility. In a further embodiment, an internally mounted storage device and/or a secured-in-place data storage device have a lower physical accessibility than a hot-swappable data storage device and/or an externally mounted data storage device.

In one embodiment, storing data on a data storage device of the plurality of data storage devices based on the classified physical accessibility for the data storage device and sensitivity of the data includes storing data with a higher sensitivity on a data storage device of the plurality of data storage device with a lower physical accessibility. In an additional embodiment, storing data on a data storage device of the plurality of data storage devices based on the classified physical accessibility for the data storage device and sensitivity of the data includes determining a sensitivity level of data to be stored and storing the data on a data storage device with an appropriate level of physical accessibility.

One embodiment of a method for storing data based on physical accessibility of the data storage devices includes acquiring information related to physical accessibility for a plurality of data storage devices, each data storage device operably connected to a computing device. The method includes classifying the physical accessibility for each of the plurality of data storage devices based on the acquired information. The method includes storing data on a data storage device of the plurality of data storage devices based on the classified physical accessibility for the data storage device and sensitivity of the data. The data with a higher sensitivity is stored on a data storage device classified with a lower accessibility than data with a lower sensitivity.

In one embodiment, acquiring information related to physical accessibility includes accessing configuration information for one or more of the plurality of data storage devices, wherein the configuration information of a data storage device indicates physical accessibility of the data storage device. In an additional embodiment, acquiring the information related to physical accessibility includes determining a data storage device temperature for one or more data storage devices in the plurality of data storage devices and one or more ambient temperatures for one or more environments containing the one or more data storage devices.

In one embodiment, classifying the physical accessibility for each of the plurality of data storage devices includes determining a level of physical security for each of the plurality of data storage devices. In a further embodiment, storing data on a data storage device of the plurality of data storage devices based on the classified physical accessibility for the data storage device and sensitivity of the data includes storing data with a higher sensitivity on a data storage device of the plurality of data storage device with a lower physical accessibility. In an additional embodiment, storing data on a data storage device of the plurality of data storage devices based on the classified physical accessibility for the data storage device and sensitivity of the data includes determining a sensitivity level of data to be stored and storing the data on a data storage device with an appropriate level of physical accessibility.

One embodiment of a program product for storing data based on physical accessibility of the data storage devices includes a computer readable storage medium that stores code executable by a processor. The executable code includes code to acquire information related to physical accessibility for a plurality of data storage devices, each data storage device operably connected to a computing device. The executable code includes code to classify the physical accessibility for each of the plurality of data storage devices based on the acquired information. The executable code includes code to store data on a data storage device of the plurality of data storage devices based on the classified physical accessibility for the data storage device and sensitivity of the data. The data with a higher sensitivity is stored on a data storage device classified with a lower accessibility than data with a lower sensitivity.

FIG. 1 is a schematic block diagram illustrating one embodiment of a system 100 for storing data on data storage devices based on physical accessibility of the data storage devices. In certain embodiments, the system 100 may include a server 102. Further, the server 102 may include a processor 104, a memory 106, and a communication interface 108. In some embodiments, the server 102 may communicate through the communication interface 108 with one or more computing devices 110a, 110b, 110c, 110d (collectively or generically "110") may store data on an associated data storage device 112, 122, 132, 142. In certain embodiments, even though a specific number of servers 102, processors 104, memory 106, communication interfaces 108, computing devices 110, are depicted in FIG. 1, one of skill in the art will recognize, in light of this disclosure, that any number of the foregoing may be included in the system 100.

The server 102, in one embodiment, is capable of communicating with and/or controlling the computing devices 110 includes a desktop computer, a laptop computer, a tablet computer, a workstation, a mainframe computer, a baseboard management controller ("BMC"), a storage area network ("SAN") controller, a smart phone, a security system, or another computing device comprising a processor (e.g., a central processing unit ("CPU"), a processor core, a field programmable gate array ("FPGA") or other programmable logic, an application-specific integrated circuit ("ASIC"), a controller, a microcontroller, and/or another semi-conductor integrated circuit device), a volatile memory, and/or a non-volatile storage medium.

The processor 104, in one embodiment, may include a central processing unit ("CPU") for the server 102. The processor 104 may be configured as a microprocessor. The processor 104 may be a multi-core processor that includes multiple different processing cores on a single processing unit. Each processor 104 and/or processing core may be communicatively coupled to a memory 106. The memory 106, in one embodiment includes volatile memory such as random-access memory ("RAM"), virtual memory, RAM disk, shadow RAM, registers, caches (either on the same die as the processor 104 and/or external to the processor 104), and/or the like. In some embodiments, the processor 104 may also refer to a programmable hardware device, ASIC or other device capable of implementing the accessibility apparatus 150.

In certain embodiments, the processor 104 executes instructions stored on the memory 106 that direct the processor 104 to communicate with one or more computing devices 110 through a communication interface 108. The computing devices 110 may also have a communication interface 108 (not shown). As described herein, the communication interfaces 108 provide either a wired or a wireless connection through which information may be communicated to other computing devices 110. In some embodiments, when the communication interfaces 108 provide a wired connection to other computing devices 110, the server 102 may be connected through an ethernet connection, a modem, a fiber-optic cable, or other wired connection known to one having skill in the art.

In further embodiments, the communication interfaces 108 may communicate with one or more of the computing devices 110 through a wireless connection. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission (IEC), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the server 102 may form a network with one or more of the computing devices 110. When the server 102 is part of a network, the network, in one embodiment, may include a digital communication network that transmits Digital Communications. The network may include a wireless network, such as a wireless cellular network, a local wireless network, such as a Wi-Fi network, a Bluetooth® network, a near-field communication ("NFC") network, an ad hoc network, and/or the like. The network may include a wide area network ("WAN"), a storage area network ("SAN"), a local area network ("LAN"), an optical fiber network, the Internet, or other digital communication network. The network may include two or more networks. The network may also include one or more servers, routers, switches, bridges, and/or other networking equipment. The network may also include one or more computer readable storage media, such as a hard disk drive, an optical drive, non-volatile memory, RAM, or the like.

In a manner similar to server 102, the computing devices 110 may be a desktop computer, a rack-mounted server such as a blade server, a SAN controller, a BMC, a mainframe computer, a laptop computer, a security system, a set-top box, a gaming console, or another computing device that stores data on data storage devices 112, 122, 132, 142 that are internally mounted, externally mounted, rack-mounted or other and that includes a processor (e.g., a central processing unit ("CPU"), a processor core, a field programmable gate array ("FPGA") or other programmable logic, an application-specific integrated circuit ("ASIC"), a controller, a microcontroller, and/or another semi-conductor integrated circuit device), a volatile memory, and/or a non-volatile storage medium.

As illustrated, a computing device 110 may be connected to or include a data storage device 112, 122, 132, 142. In certain embodiments, the data storage devices 112, 122, 132, 142 may include volatile memory such as random-access memory ("RAM"), virtual memory, RAM disk, shadow RAM, registers, caches, and/or the like. Further, the data storage devices 112, 122, 132, 142 may be part of or include an external hard drive, an internal hard drive, a hard drive mounted to a computer chassis, and/or a rack mounted storage device.

In some embodiments, a computing device 110*a* may store data in an internal data storage device 112. For example, the internal data storage device 112 may be a laptop hard drive, or the internal data storage device 112 may be a hard drive mounted within the chassis of a desktop computer. In some embodiments, a computing device 110*a*, 110*b* may store data in an externally connected data storage device 122. For example, the data storage device 122 may be an external hard drive connected to the computing device 110*b* through a USB port or other external connection type. In other embodiments, a computing device 130 may store data on a storage device 132 that is connected internally to the computing device 130 but accessible externally. For example, the data storage device 132 may be fixedly attached to the front of a computer chassis such as through screws or other attachment type. In other embodiments, a data storage device 140 may store data on data storage devices 142, where the data storage devices 142 are mounted within a rack, such as a rack found in a data center. The rack-mounted data storage devices 142 may have an exposed face and may be hot-swappable, meaning that they are easily removed by pressing a button, lever, etc. or may be secured in place with plates, screws, etc. Data may be stored on a data storage device 112, 122, 132, 142 having any combination of the above described arrangements.

In some embodiments, the server 102 and/or other computing device 110 include an accessibility apparatus 150. All or part of the accessibility apparatus 150 may reside in the server 102 and/or computing devices 110. The accessibility apparatus 150 may direct the storage of data on the different data storage devices 112, 122, 132, 142 in the system 100 based on the physical accessibility of the separate data storage devices 112, 122, 132, 142. For example, the accessibility apparatus 150, may acquire information related to the physical accessibility for the multiple data storage devices in the system 100. In some embodiments, the different data storage devices 112, 122, 132, 142 in the system 100 may be operably connected to different computing devices 110.

In certain embodiments, the accessibility apparatus 150 may acquire information related to the physical accessibility of the data storage devices 112, 122, 132, 142, may classify the physical accessibility for each of the data storage devices 112, 122, 132, 142 based on the acquired information, and may store data on a data storage device (e.g. 112) based on the classified physical accessibility for the data storage device 112 and sensitivity of the data. Data with a higher sensitivity is stored on a data storage device (e.g. 112) classified with a lower accessibility than data with a lower sensitivity. The accessibility apparatus is described in more detail with regard to the apparatuses 200, 300 of FIGS. 2 and 3.

The system 100 includes one or more external ambient temperature sensors 119*a*, 119*b*, 119*c*, 119*d* (collectively or generically "119") that measure room temperature and one or more internal ambient temperature sensors 114*a*, 114*b*, 114*c*, 114*d*, 114*e* (collectively or generically "114") within a computing device 110. In certain embodiments, the accessibility apparatus 150 may determine a data storage device temperature for one or more of the multiple data storage devices 112, 122, 132, 142 and ambient temperatures for one or more of the multiple environments containing the data storage devices 112, 122, 132, 142. In some embodiments, an ambient temperature may include a temperature of a room where a particular data storage device 112, 122, 132, 142 is located. In another embodiment, the ambient temperature may include an internal temperature of the computing device 110 where a data storage device 112, 122, 132, 142 is mounted.

As illustrated, the separate computing devices 110 may be in locations, such as a room (dashed lines represent walls or other physical barrier between separate computing devices 110), that have an associated external ambient temperature sensor 119, where the external ambient temperature sensors 119 may provide a measurement of the temperature for the location. In some embodiments, an external ambient temperature sensor 119 may be a thermostat for a room containing an associated computing device 110. In an alternative embodiment, an external ambient temperature sensor 119 may be a dedicated sensor for sensing an environmental temperature external to the associated computing devices 110.

In certain embodiments, the separate external ambient temperature sensors 119 may communicate with an accessibility apparatus 150 through a communication interface 108. The accessibility apparatus 150 may wirelessly communicate with one or more of the external ambient temperature sensors 119 through a mobile telephone network, a Wi-Fi network, a Bluetooth connection, a radio frequency identification communication, a ZigBee® connection, and the like. Alternatively, the accessibility apparatus 150 may communicate with the ambient temperature sensors 119, 129, 139, 149 through a wired connection, such as an ethernet connection, a fiber-optic connection, and the like.

In some embodiments, the accessibility apparatus 150 may communicate with internal ambient temperature sensors 114*a*, 114*b*, 114*c*, 114*d*, 114*e* (collectively or generically "114") associated with a particular data storage device 112, 122, 132, 142. For example, the accessibility apparatus 150 may communicate with an internal ambient temperature sensor 114 within a computing device 110. Data storage devices 112, 122, 132, 142 typically include a temperature reporting function. In some embodiments, an internal ambient temperature sensor 114 is associated with a particular data storage device (e.g. 112) and may provide a temperature of the data storage device 112 with an acceptable degree of accuracy.

Figure 2:
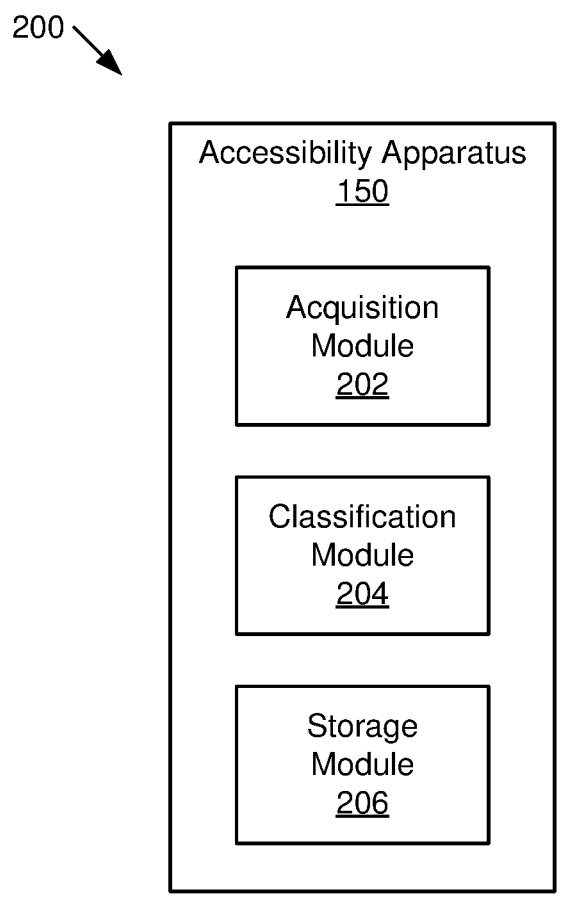
FIG. 2 is a schematic block diagram illustrating one embodiment of an apparatus for storing data on data storage devices based on physical accessibility of the data storage devices.

FIG. 2 is a schematic block diagram illustrating one embodiment of an apparatus 200 for storing data on data storage devices 112, 122, 132, 142 based on physical accessibility of the data storage devices 112, 122, 132, 142. The apparatus 200 includes an embodiment of an accessibility apparatus 150 with an acquisition module 202, a classification module 204, and a storage module 206, which are described in more detail below.

The apparatus 200 includes an acquisition module 202 that acquires information related to physical accessibility for a plurality of data storage devices 112, 122, 132, 142. Each data storage device 112, 122, 132, 142 is operably connected to a computing device 110. The information describes the physical accessibility of the data storage devices 112, 122, 132, 142 in the system 100.

In certain embodiments, the acquisition module 202 may acquire information related to the physical accessibility of the data storage devices 112, 122, 132, 142 by accessing configuration information for one or more of the multiple data storage devices 112, 122, 132, 142. The configuration information of a data storage device (e.g. 112) indicates physical accessibility of the data storage device 112. In some embodiments, the acquired configuration information may include stored information that describes a system topology of at least a portion of the multiple data storage devices 112, 122, 132, 142 and the computing devices 110 associated with the data storage devices 112, 122, 132, 142. The system topology information may indicate physical accessibility of at least a portion of the data storage devices 112, 122, 132, 142.

For example, the multiple devices in the system 100 may be connected to one another in one or more different types of system topologies. For example, the topology information may indicate a connection type between a data storage device (e.g. 122) and an associated computing device 110a. For instance, the connection type may be a universal serial bus ("USB") connection, which may indicate that the data storage device 122 is externally mounted. In at least one example, the system topology for the system 100 may be combinations of a bus topology, a linear bus, a mesh topology, a ring topology, a star topology, a tree topology, and/or the like. The acquisition module 202 may use the information regarding the topology of a system to determine the physical accessibility of the different data storage devices 112, 122, 132, 142 in the system 100.

In another example, the configuration information may directly state if a data storage device 112, 122, 132, 142 is internally mounted, is rack mounted, has an exposed surface, or is externally mounted and how a rack mounted data storage device 112, 122, 132, 142 is secured to a rack. In other embodiments, the configuration information includes locations of the data storage devices 112, 122, 132, 142, which may be used to determine physical accessibility. One of skill in the art will recognize other ways that configuration information, topology information, and the like may be used to determine if a data storage device 112, 122, 132, 142 is internally mounted, is rack mounted, has an exposed surface, or is externally mounted and how a rack mounted or exposed data storage device 112, 122, 132, 142 is secured to a rack or computing device 110.

In another embodiment, the acquisition module 202 may acquire configuration information of the different data storage devices 112, 122, 132, 142 in the multiple data storage devices of the system 100, where the configuration information includes a model number, a form factor, a data storage device type, hardware vital product data ("VPD"), component capability information and the like. In some embodiments, a model number may refer to a unique number given to a data storage device 112, 122, 132, 142 by the manufacturer of the data storage device. In some embodiments, the acquisition module 202 may identify particular characteristics about the data storage device 112, 122, 132, 142 based on the model number.

In another embodiment, the acquisition module 202 may acquire the form factor information, which identifies in what situations a particular data storage device 112, 122, 132, 142 may be used, such as within a computing device 110 or externally connected to a computing device 110. Also, the acquisition module 202 may acquire information regarding the data storage device type that may indicate the type of data storage device 112, 122, 132, 142 that is connected to a computing device 110. For example, a data storage device 112, 122, 132, 142 may be of an external type, a rack-mounted type, a hot-swappable type, or the like.

Further, the acquisition module 202 may acquire vital product data that may describe a particular data storage device 112, 122, 132, 142 and component capability information that may describe the capabilities of a particular data storage device 112, 122, 132, 142 such as how the data storage device 112, 122, 132, 142 may be connected, how much data can the data storage device 112, 122, 132, 142 stores, and the like. From the above information, the acquisition module 202 may acquire information about a particular data storage device 112, 122, 132, 142 that indicates the possible ways in which a data storage device 112, 122, 132, 142 may be used within a computing system.

In certain embodiments, the acquisition module 202 may access the configuration information from the multiple data storage devices 112, 122, 132, 142. For example, the acquisition module 202 may request configuration information stored on the computing devices 110, whereupon the computing devices 110 may provide configuration information regarding the data storage devices 112, 122, 132, 142. For example, a computing device 110 may provide a model number for a data storage device 112, 122, 132, 142 in response to a request from the acquisition module 202. Upon receiving a model number or other identification information from the computing devices 110, the accessibility apparatus 150 may access further configuration information about a data storage device 112, 122, 132, 142 from the Internet or other data repository based on the identification information received from the computing devices 110. The acquisition module 202 may use the acquired configuration information to determine the accessibility of a particular data storage device 112, 122, 132, 142.

In certain embodiments, the apparatus 200 includes a classification module 204 that classifies the physical security of data storage devices 112, 122, 132, 142 based on the information acquired by the acquisition module 202. In certain embodiments, when the acquisition module 202 has acquired information regarding the physical locations and physical accessibility of the different data storage devices 112, 122, 132, 142, the classification module 204 may classify accessibility for each of the multiple data storage devices 112, 122, 132, 142 based on the acquired information about physical locations and physical accessibility. The classification module 204 may classify accessibility by determining a comparable indicator of the physical accessibility of the separate data storage devices 112, 122, 132, 142 in the system 100. As used herein, physical accessibility is a comparable indication of how accessible a particular data storage device 112, 122, 132, 142 is to a user or potential thief. For example, the physical accessibility of a data storage device 112, 122, 132, 142 may indicate how much effort may be needed to disconnect and remove a particular data storage device 112, 122, 132, 142 from the system 100.

In some embodiments, the classification module 204 may divide the data storage devices 112, 122, 132, 142 into a secure group of data storage devices (e.g. 112, 132) and a non-secure group of data storage devices (e.g. 122, 142). For example, classification module 204 may determine that an external data storage device 122 and a hot-swappable data storage device 142 are not secure data storage devices because they may be easily removed. Conversely, the classification module 204 may determine that certain data storage devices 112, 132, 142 are secure data storage devices because they may not be easily removed without removing other components from a respective computing device 110.

For example, the classification module 204 may classify physical accessibility by determining a comparable indicator of the physical accessibility of the separate data storage devices 112, 122, 132, 142. In some embodiments, to classify the physical accessibility for the multiple data storage devices 112, 122, 132, 142, the classification module 204 determines a level of physical security for each of the data storage devices 112, 122, 132, 142.

In some embodiments, the classification module 204 may divide the data storage devices 112, 122, 132, 142 into a secure group of data storage devices and a non-secure group of data storage devices. In a further embodiment, the classification module 204 may use multiple gradations of security levels to indicate the physical accessibility of a particular data storage device 112, 122, 132, 142. For example, the classification module 204 may designate a data storage device 112, 122, 132, 142 as low security, medium security, high security, and the like.

In an alternative embodiment, the classification module 204 may determine a secure score for a group of data storage devices 112, 122, 132, 142 based on the acquired information, where the secure score indicates the security of a storage device. While any numeric range may be used, for example purposes, a secure score of 100 may indicate that a data storage device 112, 122, 132, 142 is very secure and a score of 0 may indicate that the data storage device 112, 122, 132, 142 is not secure. For example, a data storage device 122 that is externally connected to a computing device 110b, such as a desktop computer, via a USB cable in an openly accessible area may have a low secure score. Conversely, a data storage device 112, 132, 142 that is located within a computing device 110a, 110c, 110d, such as a large computer, that would require the removal of multiple other devices in order to access the data storage device 112, 132, 142, may have a high secure score.

In determining a secure score, the classification module 204 may analyze factors such as whether or not a data storage device 112, 122, 132, 142 is hot-swappable, whether a data storage device 112, 122, 132, 142 is fixed to an immovable surface using screws and the like, the location of the data storage device 112, 122, 132, 142, the type of connection of the data storage device 112, 122, 132, 142, the amount of other devices and computer components to be removed in order to access the data storage device 112, 122, 132, 142, among other factors that affect the accessibility of the data storage device 112, 122, 132, 142 to a user.

In certain embodiments, the classification module 204 may apply different levels of physical security for the different data storage devices 112, 122, 132, 142 in the system 100. For example, the classification module 204 may designate the data storage devices 112, 122, 132, 142 as either internally mounted, externally mounted, secured-in-place, and hot-swappable, wherein each of the internally mounted data storage devices 112, 142, a secured-in-place data storage device 132, a hot-swappable data storage device 142, and an externally mounted data storage device 122 have a different physical accessibility. Accordingly, an internally mounted data storage device 112, 142 and a secured-in-place data storage device 132 may have a lower physical accessibility than a hot-swappable data storage device 142 and an externally mounted data storage device 122. The classification module 204 may designate a data storage device 112, 122, 132, 142 using any number of different designations associated with the physical accessibility of the data storage devices 112, 122, 132, 142.

In a further embodiment, the storage module 206 stores data on particular storage devices 112, 122, 132, 142 based on the physical security of the data storage devices 112, 122, 132, 142 and the sensitivity of the data to be stored. In some embodiments, the storage module 206 may determine a sensitivity level of data to be stored such that the data may be stored on a data storage device 112, 122, 132, 142 with an appropriate level of physical accessibility. In some embodiments, the storage module 206 may identify data be stored as either having a high sensitivity or a low sensitivity. In some embodiments the storage module 206 may receive an indication that data has either high-sensitivity or low sensitivity from the source of the data. For example, a user may indicate the data has either a high or low sensitivity.

In an alternative embodiment, the storage module 206 may determine that data has high-sensitivity when individuals may be potentially harmed if the data were to be accessed by someone other than the intended user(s) of the data. For example, high-sensitivity data may include data related to identity information, financial information, health information, intellectual property, governmental/military operations, business operations, and the like. The storage module 206 may determine that data has low-sensitivity when the data does not harm individuals if it were potentially used by someone other than the intended user(s) of the data. For example, low-sensitivity data may include data that is only usable on the computing device 110 associated with the data storage device 112, 122, 132, 142, encrypted data, or other type of data that would not be useful to a party outside the intended user(s) of the computing device.

In an additional embodiment, the storage module 206 may determine that data has medium sensitivity, where data having medium sensitivity is data that has a lower potential for harming individuals if it were used by someone other than the intended user(s). In a further embodiment, the storage module 206 may determine a sensitivity score for data to be stored on one or more of the data storage devices 112, 122, 132, 142 in the system 100. For example, the storage module 206 may analyze multiple factors regarding data to be stored and calculate a sensitivity score based on the factors. If the sensitivity score is greater than a threshold, then the storage module 206 may determine that the data has a high-sensitivity. Conversely, if the sensitivity score is less than the threshold the storage module 206 may determine that the data has a low sensitivity. In certain embodiments, the different security scores for data may be associated with particular data storage devices 112, 122, 132, 142.

In certain embodiments, when the storage module 206 has determined the sensitivity of data, the storage module 206 may direct the data to be stored on a data storage device 112, 122, 132, 142 having an appropriate level of physical security. Data having high-sensitivity may be stored on the data storage devices (e.g. 112, 132) that are not as physically accessible as data storage devices (e.g. 122, 142) that store low sensitivity data.

Conversely, as the storage module 206 determines that data storage devices 122, 142 have low physical security, because data storage device 122 is externally connected to its respective computing device 110 and data storage device 142 may be hot-swappable, the storage module 206 may direct data having a low sensitivity to be stored on the data storage devices 122, 142 that are physically accessible.

Further, in certain embodiments, the storage module 206 may determine that a data storage device 132 may have a medium level of physical security, in part because the data storage device 132 is externally accessible but mounted to the inside of a computing device 110*c*. Accordingly, the storage module 206 may store data having a medium level of sensitivity in the data storage device 122 that is externally mounted. As described above, data having high-sensitivity may be stored on the data storage devices 112, 132 that are not as physically accessible as data storage devices 122, 142 that store low sensitivity data.

Figure 3:
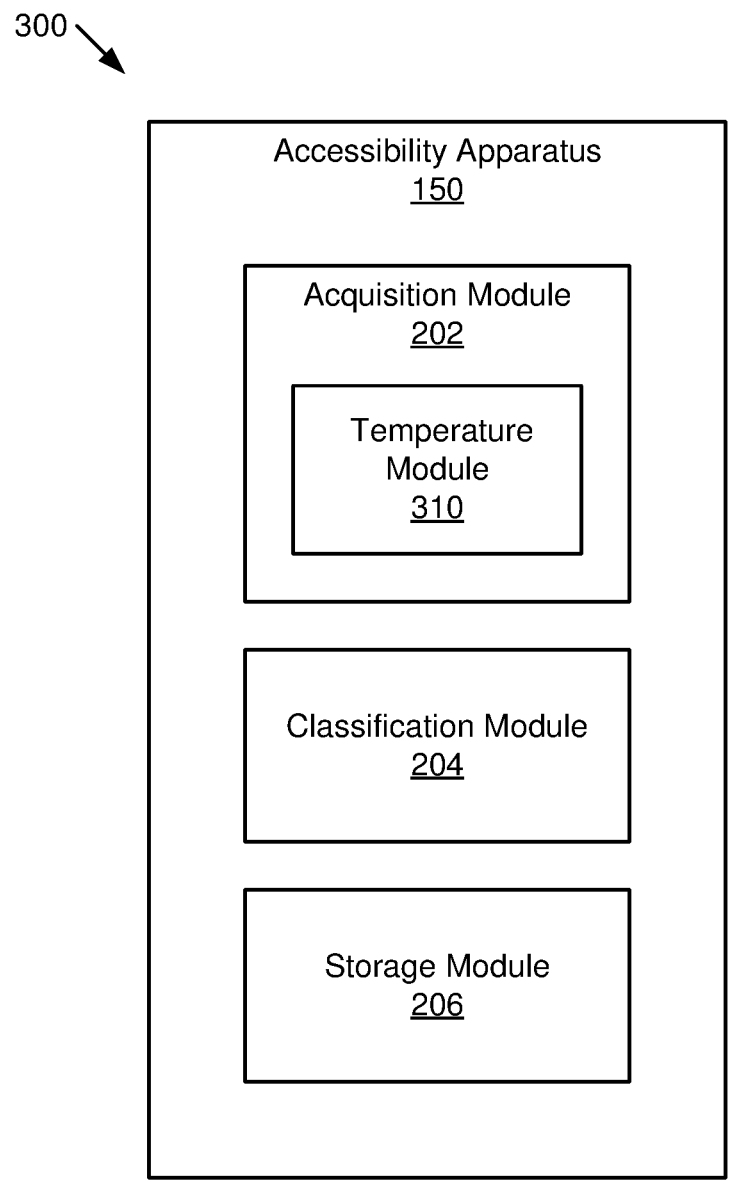
FIG. 3 is a schematic block diagram illustrating a further embodiment of an apparatus for storing data on data storage devices based on physical accessibility of the data storage devices.

FIG. 3 is a schematic block diagram illustrating a further embodiment of an apparatus 300 for storing data on data storage devices 112, 122, 132, 142 based on physical accessibility of the data storage devices 112, 122, 132, 142. The apparatus 300 includes an embodiment of an accessibility apparatus 150. The accessibility apparatus 150 includes an acquisition module 202, a classification module 204, a storage module 206, which function substantially as described above with regards to the apparatus 200 described in FIG. 2. Additionally, the acquisition module 202 may include a temperature module 310. Further, the classification module 204 may include a physical security module 312. Also, the storage module 206 may include a data sensitivity module 314. The information access module 308, temperature module 310, physical security module 312, and data sensitivity module 314 are described in more detail below.

In certain embodiments, the apparatus 300 includes an information access module 308 that accesses information regarding the physical accessibility of the multiple data storage devices 112, 122, 132, 142 connected to a server 102 or computing device 110. In some embodiments, the information access module 308 may acquire information related to the physical accessibility for the multiple data storage devices 112, 122, 132, 142.

In certain embodiments, the apparatus 300 includes a temperature module 310 that acquires information regarding the ambient temperature of an environment containing a data storage device 112, 122, 132, 142 and a temperature at a data storage device 112, 122, 132, 142 in the environment. In certain embodiments, the temperature module 310 may determine a data storage device temperature for one or more of the multiple data storage devices 112, 122, 132, 142 and ambient temperatures for one or more of the multiple environments containing the data storage devices 112, 122, 132, 142. For example, the temperature module 310 may acquire temperature measurements from the external ambient temperature sensors 119 for an environment containing a data storage device 112, 122, 132, 142 and/or from the internal ambient temperature sensors 114. The internal ambient temperature sensors 114 associated with the various data storage devices 112, 122, 132, 142 may provide an ambient temperature measurement at the location of a data storage device 112, 122, 132, 142 to the temperature module 310.

In certain embodiments where an internal ambient temperature sensor 114 represents a temperature of an associated data storage device 112, 122, 132, 142, the temperature module 310 may determine whether a data storage device 112, 122, 132, 142 is internal or external to a computing device 110 by determining a difference between a data storage device temperature for the data storage devices 112, 122, 132, 142 and an external ambient temperature for the data storage devices 112, 122, 132, 142 being greater than a temperature difference threshold. For example, the temperature module 310 may calculate a difference between the temperature measured by an external ambient temperature sensor 119 and an internal ambient temperature sensor 114. When the temperature module 310 has calculated a difference between the temperature measurements, the temperature module 310 may then compare the temperature difference against a threshold. In response to the comparison of the temperature difference against a temperature difference threshold, the temperature module 310 may determine whether the data storage device 112, 122, 132, 142 associated with the temperature sensor is an external or an internal data storage device 112, 122, 132, 142.

In at least one exemplary embodiment, where an external ambient temperature sensor 119 is used with regards to a data storage device 112 internal to a computing device 110*a*, 110*b*, the difference between the temperature measurements acquired by the ambient temperature sensor 119 and the temperature sensor 114 may be greater than the temperature difference threshold. For example, the temperature internal to a computing device 110 may be higher than a room temperature so that when the temperature difference is above a threshold the temperature module 310 may determine that the data storage device 112 is internal to a computing device 110.

In an alternative example, with regards to an external data storage device 122, the difference between the temperature measurements acquired by an external ambient temperature sensor 119 and the internal ambient temperature sensor 124 may be less than the temperature difference threshold. As the temperature difference is less than the temperature difference threshold, the temperature module 310 may determine that the data storage device 122 associated with the internal ambient temperature sensor 114*b* of the computing device 110*b* connected to the data storage device 122 is externally connected to the computing device 110*b*. Where the data storage devices 112, 122, 132, 142 report temperature, the temperature module 310 may determine a difference between the external ambient temperature sensors 119 and the reported temperature of the data storage devices 112, 122, 132, 142 to determine if the data storage devices 112, 122, 132, 142 are internal or external.

In another embodiment, the temperature module 310 may rely on internal ambient temperature sensors 114. For example, the data storage devices 112, 122, 132, 142 may report a temperature so that the temperature module 310 may determine a difference between the internal ambient temperature sensors 114 and temperatures of associated data storage devices 112, 122, 132, 142 and compare the temperature differences against a threshold. For example, the temperature module 310 may determine a difference between the temperature of the internal ambient temperature sensor 114*a* of a computing device 110*a* and the temperature of an associated data storage device 112. Where the temperature difference is below the threshold, the temperature module 310 may determine that the data storage device 112 is internal to the computing device 110*a*. In another embodiment, the temperature module 310 may determine the difference between another internal ambient temperature sensor 114*b* in a computing device 110*b* and a temperature of an associated data storage device 122. Where the temperature difference is above the threshold, the temperature module 310 may determine that the data storage device 122 is external to the computing device 110*b*.

Note that computing devices 110 may include internal ambient temperature sensors 114 in various locations, which may provide different information. For example, where an internal ambient temperature sensor 114d of a computing device (e.g. 110d) is near an air intake, temperature readings of the internal ambient temperature sensor 114d may be indicative of room temperature air. Another internal ambient temperature sensor 114e may be located by an exhaust port or another location indicative of an internal temperature of the computing device 110d. A data storage device 142 that interior may be closer to the temperature of the internal ambient temperature sensor 114e near the air exhaust port and may be internally mounted.

In a further exemplary embodiment, with regards to rack-mounted data storage devices 142 in a data center like environment, some of the data storage devices 142 may be located on a face or location on the rack that is exposed to the ambient air of a room containing the computing device 110d, where the ambient air temperature is measured by the ambient temperature sensor 114d near an air intake. For example, the data storage devices 142 may be exposed to the ambient air of the room containing the computing device 110d. For instance, the data storage devices 142 may be mounted on a face of a rack, which may have a temperature lower than an internally mounted data storage device 112, but higher than an externally mounted data storage device 112. The temperature module 310 may use internal and external ambient temperature sensors 114, 119 to determine if the data storage devices 112, 122, 132 142 are internal, external or rack-mounted.

In one embodiment, the temperature module 310 takes temperature readings when on start up on and before the components of the system 100 are stressed or when data storage devices 112, 122, 132, 142 are lightly accessed, which may be more accurate when determining if a data storage device 112, 122, 132, 142 is internal or external. For example, an external data storage device 122 is just activated or is lightly accessed, the temperature of the data storage device 122 may be closer to the ambient temperature of the room where the data storage device 122 is located. An external data storage device 122 that is accessed heavily may be much hotter than the ambient temperature of the room where it is located, which may result in the data storage device 122 being incorrectly classified as internally mounted.

In some embodiment, the temperature module 310 uses both internal ambient temperature sensors 114 and external ambient temperature sensors 119 to compare with temperatures of data storage devices 112, 122, 132, 142, which may be used to correct for the higher temperatures associated with a data storage device 112, 122, 132, 142 that is in use. One of skill in the art will recognize other ways for the temperature module 310 to use temperature data to determine if data storage devices 112, 122, 132, 142 are internally or externally mounted.

Figure 4:
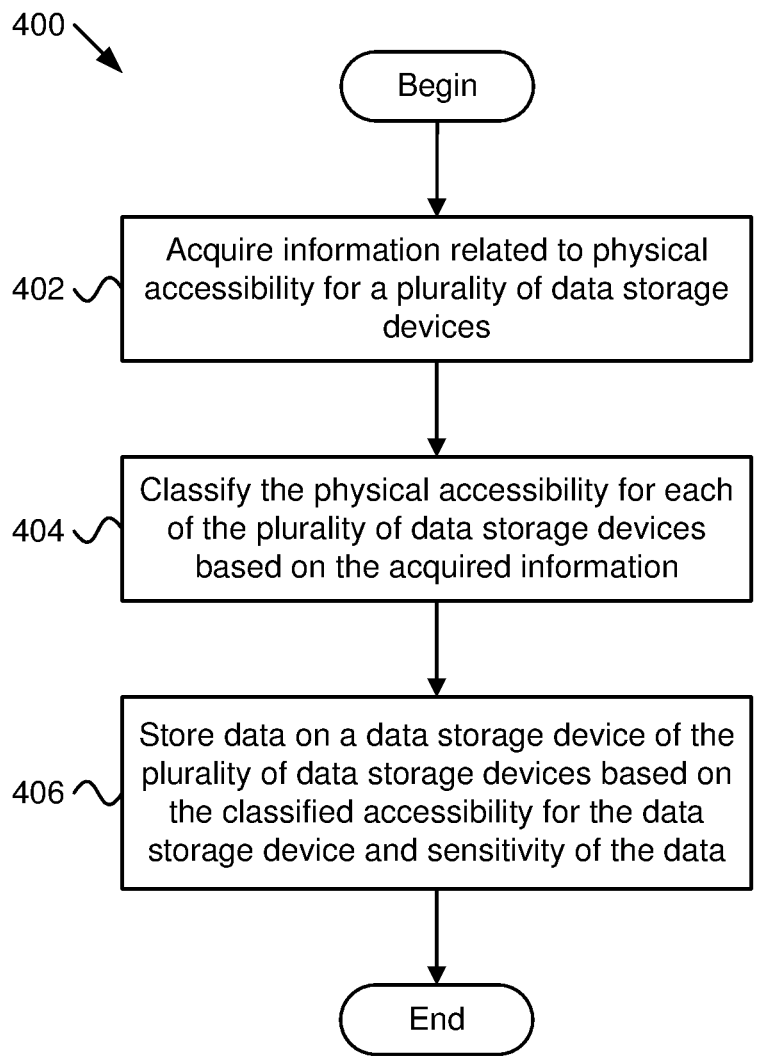
FIG. 4 is a schematic flow chart diagram illustrating one embodiment of a method for storing data on data storage devices based on physical accessibility of the data storage devices.

FIG. 4 is a schematic flow chart diagram illustrating one embodiment of a method 400 for storing data on data storage devices 112, 122, 132, 142 based on physical accessibility of the data storage devices 112, 122, 132, 142. In one embodiment, the method 400 begins and acquires 402 information related to physical accessibility for a plurality of data storage devices 112, 122, 132, 142. In some embodiments, each data storage device 112, 122, 132, 142 is be operably connected to a computing device 110. The method 400 classifies 404 the physical accessibility for each of the plurality of data storage devices 112, 122, 132, 142 based on the acquired information. The method 400 stores 406 data on a data storage device 112, 122, 132, 142 of the plurality of data storage devices 112, 122, 132, 142 based on the classified physical accessibility for the data storage device 112, 122, 132, 142 and sensitivity of the data. Further, data with a higher sensitivity may be stored on a data storage device 112, 122, 132, 142 classified with a lower accessibility than data with a lower sensitivity. The method 400 then ends. In one embodiment, the acquisition module 202, the classification module 204, and the storage module 206 may perform the various steps of the method 400.

Figure 5:
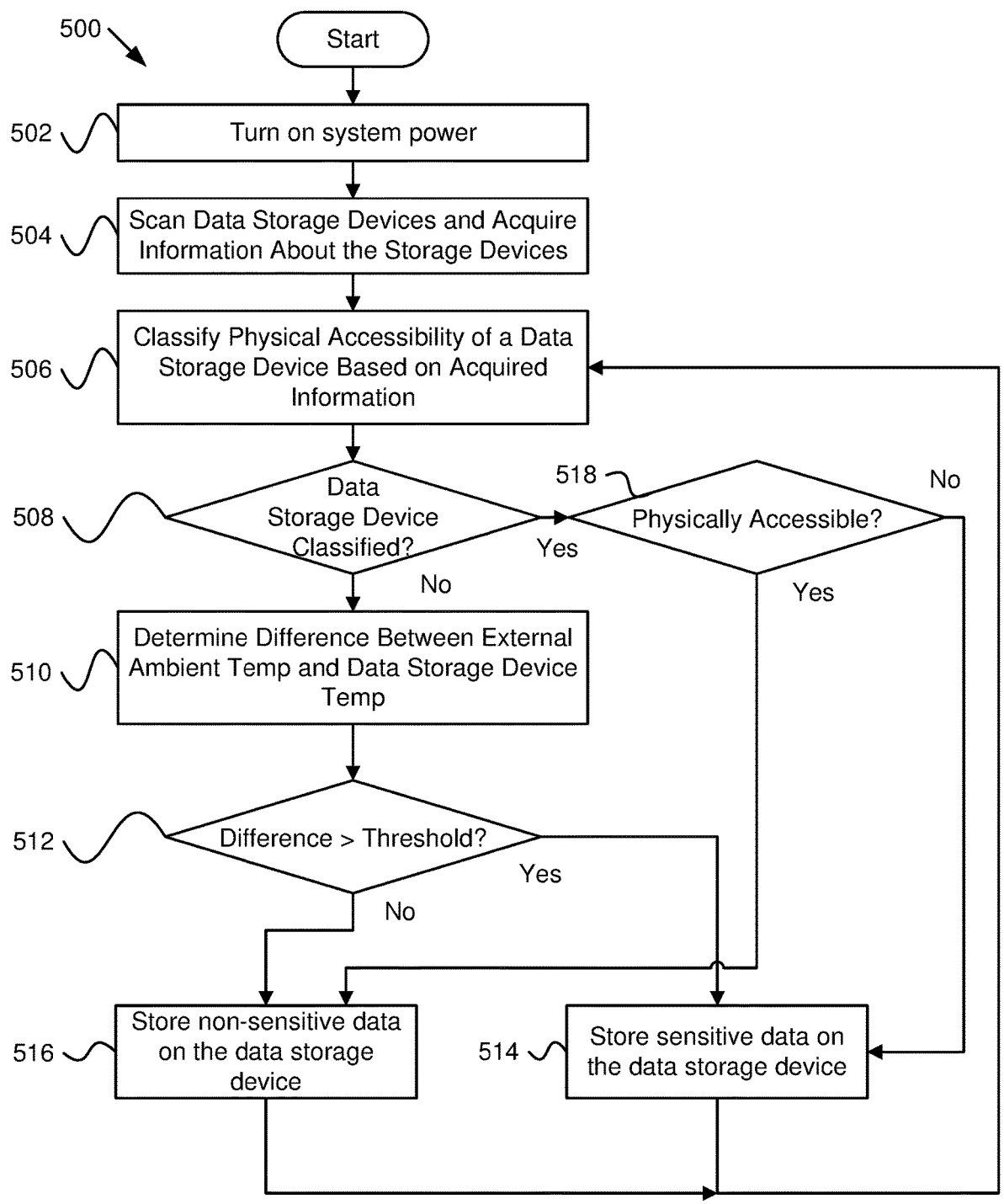
FIG. 5 is a schematic flowchart diagram illustrating one embodiment of another method for storing data on data storage devices based on physical accessibility of the data storage devices.

FIG. 5 is a schematic flowchart diagram illustrating one embodiment of another method 500 for storing data on data storage devices 112, 122, 132, 142 based on physical accessibility of the data storage devices 112, 122, 132, 142. In one embodiment, the method 500 begins and turns 502 on system power. In some embodiments, acquiring physical accessibility information at turn on is beneficial to get temperature data before data storage devices 112, 122, 132, 142 are stressed and heat up. In further embodiments, the method 500 scans 504 data storage devices 112, 122, 132, 142 and acquires information about the data storage devices 112, 122, 132, 142. The method 500 classifies 506 physical access of a data storage devices (e.g. 112) based on the acquired information.

The method 500 determines 508 if a data storage device 112, 122, 132, 142 is classified in terms of physical accessibility. If the method 500 determines that a data storage device 112, 122, 132, 142 is not classified, the method 500 determines 510 a difference between an external ambient temperature and a temperature of the data storage device 112 and determines 512 if the difference is above a threshold. If the method 500 determines 512, that the temperature difference is above the threshold, which is indicative of an internally mounted data storage device 112 that has low physical accessibility, the method 500 stores 514 sensitive data on the data storage device 112 and returns to classify 506 another data storage device (e.g. 132). If the method 500 determines 512 that the temperature difference is below the threshold, indicative of a data storage device (e.g. 122) that is externally mounted and has a high physical accessibility, the method 500 stores non-sensitive data on the data storage device 122 and returns to classify 506 another data storage device 132.

If the method 500 determines 508 that the data storage device 112 is classified in terms of physical accessibility, the method 500 determines 518 if the data storage device 112 is physically accessible. If the method 500 determines 518 that the data storage device 112 is not physically accessible, the method 500 stores 514 sensitive data on the data storage device 112 and returns to classify 506 another data storage device (e.g. 142). If the method 500 determines 518 that the data storage device (e.g. 122) is physically accessible, the method 500 stores 516 non-sensitive data on the data storage device 122 and returns to classify 506 another data storage device 142. In one embodiment, the acquisition module 202, the temperature module 310, the classification module 204, and the storage module 206 may perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
acquire information related to physical accessibility for a plurality of data storage devices, each data storage device operably connected to a computing device, wherein physical accessibility comprises a comparable indication of how susceptible the data storage device is to being physically disconnected and removed, and wherein the data storage devices are non-volatile storage devices, wherein acquiring the information related to physical accessibility comprises determining a data storage device temperature for one or more data storage devices in the plurality of data storage devices and one or more ambient temperatures for one or more environments containing the one or more data storage devices and wherein determining a data storage device temperature comprises determining a difference between the data storage device temperature for the data storage device and an ambient temperature for the data storage device being greater than a temperature difference threshold;
classify the physical accessibility for each of the plurality of data storage devices based on the acquired information, the classification comprising a degree of physical accessibility assigned to each of the plurality of data storage devices; and
store data on a data storage device of the plurality of data storage devices based on the classified physical accessibility for the data storage device and sensitivity of the data, wherein data with a higher sensitivity is stored on a data storage device classified with a lower physical accessibility than data with a lower sensitivity.

2. The apparatus of claim 1, wherein acquiring information related to physical accessibility comprises accessing configuration information for one or more of the plurality of data storage devices, wherein the configuration information of a data storage device indicates physical accessibility of the data storage device.

3. The apparatus of claim 2, wherein the configuration information comprises stored information related to a system topology of at least a portion of the plurality of data storage devices and associated computing devices, the system topology information indicating physical accessibility of the at least a portion of the plurality of data storage devices.

4. The apparatus of claim 2, wherein the configuration information of a data storage device of the plurality of data storage devices comprises one or more of a model number, a form factor, a data storage device type, hardware vital product data ("VPD"), and component capability information.

5. The apparatus of claim 2, wherein accessing the configuration information comprises accessing the configuration from the plurality of data storage devices.

6. The apparatus of claim 1, wherein the ambient temperature comprises one of an ambient temperature of a room where the data storage device is located and an ambient temperature internal to a computing device where the data storage device may be mounted.

7. The apparatus of claim 1, wherein classifying the physical accessibility for each of the plurality of data storage devices comprises determining a level of physical security for each of the plurality of data storage devices.

8. The apparatus of claim 7, wherein levels of physical security for the data storage devices comprise one or more of internally mounted, externally mounted, secured-in-place, and hot-swappable, wherein each of an internally mounted data storage device, a secured in place data storage device, a hot-swappable data storage device and an externally mounted data storage device each have a different physical accessibility.

9. The apparatus of claim 8, wherein one or more of an internally mounted storage device and a secured-in-place data storage device have a lower physical accessibility than one or more of a hot-swappable data storage device and an externally mounted data storage device.

10. The apparatus of claim 1, wherein storing data on a data storage device of the plurality of data storage devices based on the classified physical accessibility for the data storage device and sensitivity of the data comprises determining a sensitivity level of data to be stored and storing the data on a data storage device with a level of physical accessibility that matches the sensitivity level of the data to be stored.

11. A method comprising:
acquiring information related to physical accessibility for a plurality of data storage devices, each data storage device operably connected to a computing device, wherein physical accessibility comprises a comparable indication of how susceptible the data storage device is to being physically disconnected and removed, and wherein the data storage devices are non-volatile storage devices, wherein acquiring the information related to physical accessibility comprises determining a data storage device temperature for one or more data storage devices in the plurality of data storage devices and one or more ambient temperatures for one or more environments containing the one or more data storage devices and wherein determining a data storage device temperature comprises determining a difference between the data storage device temperature for the data storage device and an ambient temperature for the data storage device being greater than a temperature difference threshold;
classifying the physical accessibility for each of the plurality of data storage devices based on the acquired information, the classification comprising a degree of physical accessibility assigned to each of the plurality of data storage devices; and
storing data on a data storage device of the plurality of data storage devices based on the classified physical accessibility for the data storage device and sensitivity of the data, wherein data with a higher sensitivity is stored on a data storage device classified with a lower physical accessibility than data with a lower sensitivity.

12. The method of claim 11, wherein acquiring information related to physical accessibility comprises accessing configuration information for one or more of the plurality of data storage devices, wherein the configuration information of a data storage device indicates physical accessibility of the data storage device.

13. The method of claim 11, wherein classifying the physical accessibility for each of the plurality of data storage devices comprises determining a level of physical security for each of the plurality of data storage devices.

14. The method of claim 11, wherein storing data on a data storage device of the plurality of data storage devices based on the classified physical accessibility for the data storage device and sensitivity of the data comprises determining a sensitivity level of data to be stored and storing the data on a data storage device with a level of physical accessibility that matches the sensitivity level of the data to be stored.

15. A program product comprising a non-transitory computer readable storage medium that stores code executable by a processor, the executable code comprising code to:

acquire information related to physical accessibility for a plurality of data storage devices, each data storage device operably connected to a computing device, wherein physical accessibility comprises a comparable indication of how susceptible the data storage device is to being physically disconnected and removed, and wherein the data storage devices are non-volatile storage devices, wherein acquiring the information related to physical accessibility comprises determining a data storage device temperature for one or more data storage devices in the plurality of data storage devices and one or more ambient temperatures for one or more environments containing the one or more data storage devices and wherein determining a data storage device temperature comprises determining a difference between the data storage device temperature for the data storage device and an ambient temperature for the data storage device being greater than a temperature difference threshold;

classify the physical accessibility for each of the plurality of data storage devices based on the acquired information, the classification comprising a degree of physical accessibility assigned to each of the plurality of data storage devices; and store data on a data storage device of the plurality of data storage devices based on the classified physical accessibility for the data storage device and sensitivity of the data, wherein data with a higher sensitivity is stored on a data storage device classified with a lower physical accessibility than data with a lower sensitivity.

* * * * *